(12) United States Patent
Kim et al.

(10) Patent No.: US 7,890,108 B2
(45) Date of Patent: *Feb. 15, 2011

(54) HANDOVER EXECUTION AND COMMUNICATION RESUMPTION IN WIRELESS ACCESS SYSTEM

(75) Inventors: Yong Ho Kim, Bucheon-si (KR); Ki Hyoung Cho, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/406,500

(22) Filed: Mar. 18, 2009

(65) Prior Publication Data

US 2009/0186616 A1 Jul. 23, 2009

Related U.S. Application Data

(63) Continuation of application No. 11/549,607, filed on Oct. 13, 2006, which is a continuation of application No. 11/150,316, filed on Jun. 10, 2005, now Pat. No. 7,818,006.

(30) Foreign Application Priority Data

Jun. 10, 2004 (KR) ...................... 10-2004-0042642

(51) Int. Cl.
H04W 36/00 (2009.01)
H04W 4/00 (2009.01)

(52) U.S. Cl. ...................... 455/436; 370/331

(58) Field of Classification Search ................. 455/436, 455/437, 439, 456, 444, 438, 450, 67.1, 515, 455/440, 433; 370/331
See application file for complete search history.

(56) References Cited

U.S. PATENT DOCUMENTS 6,055,427 A 4/2000 Ojaniemi
6,311,065 B1 * 10/2001 Ushiki et al. ................. 455/440
7,447,746 B2 * 11/2008 Yamaguchi et al. ......... 709/208
7,818,006 B2 10/2010 Kim et al.

(Continued)

FOREIGN PATENT DOCUMENTS

EP 1018849 7/2000

(Continued)

OTHER PUBLICATIONS

J.W. Kim et al., "Enhanced Handover Mechanism in IEEE P802.16e/ D2-2004," IEEE 802.16 Broadband Wireless Access Working Group, IEEE C802.16e-04/60r1, May 2004.
H. Kang et al., "Resource Remain Type for Drop or Ping Pong Call Recovery," IEEE 802.16 Broadband Wireless Access Working Group, IEEE C802.16e-04/55r1, May 2004.

(Continued)

*Primary Examiner*—Melody Mehrpour
(74) *Attorney, Agent, or Firm*—Lee, Hong, Degerman, Kang & Waimey

(57) ABSTRACT

Handover execution and communication resumption in a wireless access system is provided. Performing a handover includes communicating with a serving base station through a first communication link and receiving from the serving base station, handover information associated with at least one candidate target base station. The method also includes transmitting handover indicator to the serving base station indicating a handover operation to a selected target base station and performing a ranging procedure with the selected target base station to establish a second communication link with the selected target base station while maintaining the first communication link with the serving base station. The method also includes being released from the serving base station in response to a handover complete status message from the selected target base station to the serving base station, or resuming normal communication with the serving base station if the handover fails with the selected target base station.

6 Claims, 6 Drawing Sheets

U.S. PATENT DOCUMENTS

| | | |
|---|---|---|
| 2002/0045448 A1 | 4/2002 | Park et al. |
| 2002/0119779 A1 | 8/2002 | Ishikawa et al. |
| 2004/0058678 A1* | 3/2004 | deTorbal ............... 455/437 |
| 2005/0096051 A1 | 5/2005 | Lee et al. |
| 2005/0098051 A1 | 5/2005 | Flint et al. |
| 2005/0192011 A1* | 9/2005 | Hong et al. ............ 455/440 |
| 2005/0272426 A1 | 12/2005 | Yang et al. |
| 2005/0288023 A1 | 12/2005 | Kim et al. |
| 2007/0072615 A1 | 3/2007 | Kim et al. |
| 2007/0254666 A1* | 11/2007 | De Jong et al. ........ 455/436 |
| 2009/0181678 A1 | 7/2009 | Kim et al. |
| 2009/0181680 A1 | 7/2009 | Kim et al. |
| 2009/0186616 A1 | 7/2009 | Kim et al. |
| 2009/0275353 A1 | 11/2009 | Fujita et al. |

FOREIGN PATENT DOCUMENTS

| | | |
|---|---|---|
| JP | 2007-536786 | 12/2007 |
| JP | 2008-503172 | 1/2008 |
| KR | 10-2002-0012957 | 2/2002 |
| KR | 10-2002-0056315 | 7/2002 |
| KR | 10-2002-0064987 | 8/2002 |
| KR | 10-0688303 | 3/2007 |
| WO | 01-99291 | 12/2001 |
| WO | 02-089502 | 11/2002 |

OTHER PUBLICATIONS

IEEE 802.16 Task Group e., "Part 16: Air Interface for Fixed and Mobile Broadband Wireless Access Systems—Amendment for Physical and Medium Access Control Layers for Combined Fixed and Mobile Operation in Licensed Bands," IEEE 802.16e-03/07r5, Dec. 2003.

S. Kim et al., "Overall HO Procedures for IEEE 802.16," IEEE 802.16 Broadband Wireless Access Working Group, IEEE C802.16e-03/47, XP-002334169, Sep. 2003.

P. Barber, "Revision of Hand-over Mechanism for Mobility Enhancement," IEEE 802.16 Broadband Wireless Access Working Group, IEEE C802.16e-04/10, Jan. 2004.

Y. Leiba et al., "Handoff Text Clarifications and Enhancements," IEEE 802.16 Broadband Wireless Acsess Working Group, IEEE 802.16e-04/87r1, May 2004.

H. Lim et al., "Enhancement of the BS-Initiated Handover," IEEE 802.16 Broadband Wireless Access Working Group, IEEE C802.16e-04/59, May 2004.

* cited by examiner

HANDOVER EXECUTION AND COMMUNICATION RESUMPTION IN WIRELESS ACCESS SYSTEM

CROSS-REFERENCE TO RELATED APPLICATIONS

This application is a continuation of currently pending U.S. application Ser. No. 11/549,607 filed Oct. 13, 2006, which is a continuation of U.S. application Ser. No. 11/150,316 filed Jun. 10, 2005, now U.S. Pat. No. 7,818,006, which pursuant to 35 U.S.C. §119(a), claims the benefit of earlier filing date and right of priority to Korean Application No. 10-2004-0042642, filed Jun. 10, 2004, the contents of which are hereby incorporated by reference herein in their entirety.

FIELD OF THE INVENTION

The present invention relates generally to a wireless access system, and more particularly to handover execution in a wireless access system.

BACKGROUND OF THE INVENTION

The IEEE 802.16e system is part of a global standardization for broadband wireless access systems. IEEE 802.16e does not have a hierarchical structure of HLR, VLR, MSC, BSC, RNC, etc. unlike second and third generation mobile communications systems, but does include a mobile subscriber station (MSS), a base station (BS), and an authentication service authorization server (ASA server). A physical (PHY) layer and a medium access control (MAC) layer are defined between the BS and the MSS.

A handover process in a broadband wireless access system according to a related art is explained as follows.

1. Pre-Processing for Handover

Pre-processing for handover includes broadcasting associated information from a base station to a neighboring base station to inform all mobile subscriber stations within a respective cell of the associated information (Network Topology Advertisement). The pre-processing also includes measuring a channel quality of the neighboring base station based on the associated information (MSS Scanning of Neighboring BS). The pre-processing also includes matching parameters between the base station and the neighboring base station, such as for example, an initial mobile subscriber station power, a time difference for synchronization, and other parameters (Association Procedures).

a. Network Topology Advertisement

In network topology advertisement, the base station broadcasts information associated with network configuration to all mobile subscriber stations within a cell via a MOB_NBR-ADV MAC message, thereby providing all mobile subscriber stations within the cell with the information pertaining to neighboring base stations.

b. MSS Scanning of Neighboring BS

In MSS scanning of neighboring BS, a mobile subscriber station (MSS) scans a neighboring base station (BS) and requests a scanning interval for scanning the neighboring BS from the BS via a MOB_SCN-REQ MAC message. The BS then transmits a MOB_SCN-RSP MAC message in response to the request to assign an interval for scanning (scanning interval) the neighboring BS. Alternatively, the BS may directly transmit the MOB_SCN_RSP MAC message without a request from the MSS (unsolicited response). In the case of an unsolicited response, the scanning interval and an offset unit for scanning start are assigned on a frame unit basis.

c. Association Procedures

During association procedures, the MSS performs a ranging process with a BS to normally join a cell. In the ranging process, the MSS acquires basic information for communications from the BS. In other words, the MSS performs BS scanning to select a new BS and then performs the association procedures. The MSS and the BS transmit a RNG_REQ MAC message and a RNG_RSP MAC message, respectively, to set values such as for example, a power offset value, a timing offset value, and other values of the MSS to suitable values. Transmission of the RNG_REQ MAC message is called an initial ranging operation and is a basic operation that the MSS may perform in a network entry procedure. When a handover is performed, a target BS accepts a new MSS and transmits items associated with the respective cell of the new MSS to the former serving BS and stores information pertaining to the MSS.

2. Handover Process

In a handover (HO) process, the MSS initiates handover with the neighboring BS based on the channel quality information acquired in the handover pre-processing.

a. Cell Selection

In a cell selection procedure, a cell is changed to enable the MSS to make a new registration to a BS, allowing for reception of a signal having an SINR (signal to interference noise ratio) superior to that of a signal transmitted from the BS of the current cell, prior to a normal registration of the MSS to a cell. In such case, since the MSS does not perform the registration procedure, the BS is unable to determine a moving situation of the MSS.

b. HO (Handover) Initiation

In HO initiation, a handover may be initiated by the MSS or the BS. When the BS requests (initiates) a handover, the BS transmits a MOB_BSHO-REQ MAC message to the MSS. On the contrary, when the MSS requests a handover, the MSS transmits a MOB_MSSHO-REQ MAC message to the BS.

If the MSS transmits the MOB_MSSHO-REQ MAC message, the MSS preferentially transmits the SINR of a signal received from a neighboring BS to the BS to enable the MOB_MSSHO-REQ MAC message to be transmitted to a current serving BS. The current serving BS then selects a candidate BS as a target BS for performing the handover.

In a case where the BS receives the MOB_MSSHO-REQ MAC message from the MSS or in a case when the BS has not yet transmitted the MOB_BSHO-REQ MAC message to handover the MSS, the BS may allow the handover of the MSS after confirmation of an acknowledgement (ACK) for handing over a specific MSS from the neighboring BS. After receiving the MOB_BSHO/MSSHO-REQ MAC message, the MSS/BS transmits a MOB_MSSHO/BSHO-RSP MAC message to inform the BS/MSS of a target BS for the handover.

c. HO Cancellation

In HO cancellation, after the MSS/BS transmits the MOB_MSSHO/BSHO-REQ MAC message, the MSS may cancel the handover. In canceling the HO, the MSS sets a specific field (HO_Type=01) of a MOB_HO-IND MAC message and transmits the set field to the BS. The BS receives the message and cancels the proceeding handover.

d. Termination with the Serving BS

In termination with the serving BS, the MSS transmits the MOB_HO-IND MAC message to inform the serving BS that the handover is normally completed and then completes the handover operation. In completing the handover operation, the MSS sets a specific field (HO_Type=00) of the MOB_HO-IND MAC message to transmit the information pertaining to the normal handover termination to the serving BS. The serving BS receives the MOB_HO-IND MAC message from the MSS and terminates a MAC state machine allocated to the MSS. The serving BS also terminates an ARQ (automatic repeat request) connection and all connections associated with data transmission.

e. HO Rejection

In HO rejection, the MSS is capable of rejecting a handover recommended by the BS. In rejecting a handover, the MSS sets a specific field (HO_Type=10) of the MOB_HO-IND MAC message and transmits the message to the BS. The BS receives the rejection message from the MSS, re-seeks for a target BS and re-transmits the MOB_BSHO-RSP MAC message to the MSS.

FIG. 1 is a diagram illustrating a handover process requested by a mobile subscriber station (MSS).

Referring to FIG. 1, an MSS 11 performs a scanning procedure to measure qualities of signals transmitted from neighboring BSs (S110). If the MSS 11 determines that a handover needs to be performed based on results of the neighboring BS scanning procedure, the MSS 11 transmits a handover request message (MOB-MSS-HO-REQ) to a serving BS 12 (S111).

The serving BS 12 receives the handover request message and transmits a handover pre-notification message (HO-pre-notification) including information that the MSS 11 has requested a handover to a neighboring BS, such as for example, handover target BSs (target BSs) 13 and 14 (S112, S113). The handover pre-notification message includes an identifier (MSS identifier) of the MSS 11 requesting the handover, connection parameters, capabilities, a required bandwidth, and quality of service information.

Each of the neighboring handover target BSs 13 and 14 receives the handover pre-notification message and transmits a handover pre-notification response message (HO-pre-notification-response) to the serving BS 12 in response to the handover pre-notification message (S114, S115). The handover pre-notification response message may include acknowledgement information pertaining to the handover pre-notification message and capability information pertaining to the requested quality of service.

The serving BS 12 selects one of the neighboring handover target BSs 13 and 14 according to the response messages for the handover pre-notification and transmits a handover confirm message (HO-confirm) to the selected target BS 13 or 14 (S116). The serving BS 12 then transmits a handover response message (MOB-BSHO-RSP), including information pertaining to the selected handover target BS, to the MSS 11 (S117). The MSS 11 receives the handover response message and transmits a handover indicator message (MOB-HO-IND) to release a connection from the MSS 11 to the serving BS 12 (S118). Upon receipt of the handover indicator message from the MSS 11, the serving BS 12 releases its connection to the MSS 11 (S119).

The MSS 11 then executes a fast ranging (Fast Ranging_IE), a ranging request (RNG-REQ), and a ranging response (RNG-RSP) with the target BS 14 (S120, S121, S122). The target BS 14 becomes the serving BS 14 and the MSS 11 completes an initial network entry execution after handover (S123).

FIG. 2 is a diagram illustrating a handover process requested by a base station (BS).

Referring to FIG. 2, a serving BS 22 triggers a procedure (trigger-to-release-MSS) to release a connection from an MSS 21 according to a corresponding decision (S210).

The serving BS 22 then transmits a handover pre-notification message (HO-pre-notification) including information required for the handover of the MSS 21 to neighboring handover target BSs 23 and 24 (S211, S212). The handover pre-notification message includes an identifier (MSS identifier) of the MSS 21 requesting the handover, connection parameters, capabilities, a required bandwidth, and quality of service information.

Each of the neighboring handover target BSs 23 and 24 receive the handover pre-notification message and transmit a handover pre-notification response message (HO-pre-notification-response) to the serving BS 22 in response to the handover pre-notification message (S213, S214). The handover pre-notification response message may include acknowledgement information pertaining to the handover pre-notification message and capability information pertaining to the requested quality of service.

The serving BS 22 then transmits a handover request message to the MSS 21 based on the information received via the handover pre-notification response message (S215). The handover request message includes information pertaining to the target BSs 23 and 24 available for the handover. The MSS 21 then performs a neighboring BS scanning procedure to measure quality of signals received by the neighboring target BSs, as recognized via a handover response message (S216). In a case where the target BS 24 is found for the handover is found as a result of the neighboring BS scanning, the MSS 21 transmits a handover response message including target BS information for the handover to the serving BS 22 (S217). The serving BS 22 then transmits a handover confirm message to the target BS 24 to which the MSS 21 intends to perform the handover (S218).

The MSS 21 then transmits a handover indicator message (MOB-HO-IND) for releasing a connection from the MSS 21 to the serving BS 22 (S219). Upon receipt of the handover indicator message, the serving BS 22 releases its connection to the MSS 21 (S220).

The MSS 21 then executes a fast ranging (Fast Ranging_IE), a ranging request (RNG-REQ), and a ranging response (RNG-RSP) (S221, S222, S223) with the serving target BS 24 for the handover and then completes an initial network entry execution after handover (S224).

FIG. 3 is a diagram illustrating a process by which an MSS re-enters a former serving BS, such as in the case of a call drop.

Referring to FIG. 3, an MSS 31 performs a scanning procedure to measure qualities of signals transmitted from neighboring BSs (S310). If the MSS determines that a handover needs to be performed based on results of the neighboring BS scanning procedure, the MSS 31 transmits a handover request message (MOB-MSS-HO-REQ) to a serving BS 32 (S311).

The serving BS 32 receives the handover request message and transmits a handover pre-notification message (HO-pre-notification) including information that the MSS 31 has requested a handover to a neighboring BS, such as for example, handover target BSs 33 and 34 (S312, S313). The handover pre-notification message includes an identifier (MSS identifier) of the MSS requesting the handover, connection parameters, capabilities, a required bandwidth, and quality of service information.

Each of the neighboring handover target BSs 33 and 34 receive the pre-notification message and transmit a handover pre-notification response message (HO-pre-notification-response) to the serving BS 32 in response to the handover pre-notification message (S314, S315). The handover pre-notification response message may include acknowledgement information pertaining to the handover pre-notification message and capability information pertaining to the requested quality of service.

The serving BS 32 selects one of the neighboring handover target BSs 33 and 34 according to the response messages for the handover pre-notification and transmits a handover confirm message (HO-confirm) to the selected target BS 33 or 34 (S316). The serving BS 32 then transmits a handover response message (MOB-BSHO-RSP) including information pertaining to the target BS for the handover to the MSS 31 (S317). The MSS 31 receives the handover response message from the serving BS 32 and transmits a handover indicator message (MOB-HO-IND) to release a connection from the MSS 31 to the serving BS 32 (S318). Upon receipt of the handover indicator message, the serving BS 32 releases its connection to the MSS 31 (S319).

SUMMARY OF THE INVENTION

Accordingly, the present invention is directed to handover execution and communication resumption in a wireless access system that substantially obviates one or more problems due to limitations and disadvantages of the related art.

An object of the present invention is to provide a method of efficiently resuming communications in a wireless access system when a mobile subscriber station (MSS) returns to a former serving base station (BS) in case of a handover failure.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, a method of performing handover operation in a wireless communication system includes communicating with a serving base station through a first communication link and receiving from the serving base station, handover information associated with at least one candidate target base station, wherein the handover information comprises at least quality of service capable of being handled by the at least one candidate target base station. The method also includes transmitting a handover indicator to the serving base station indicating a handover operation to a selected target base station, wherein the mobile subscriber station determines whether to perform handover in response to the handover information, and performing a ranging procedure with the selected target base station to establish a second communication link with the selected target base station while maintaining the first communication link with the serving base station, wherein the ranging procedure comprises attempting to establish an uplink synchronization and power adjustment between the mobile subscriber station and the selected target base station. The method also includes being released from the serving base station in response to a handover complete status message from the selected target base station to the serving base station, or resuming normal communication with the serving base station if the handover fails with the selected target base station.

The method may also preferably include receiving a handover response from a serving base station upon the serving base station transmitting a handover confirmation to a handover target base station, wherein the handover response comprises at least quality of service information requested to be handled by the handover target base station. The method may also preferably include, in a mobile subscriber station initiated handover, transmitting a handover request to a serving base station through a first communication link prior to receiving the handover response from the serving base station. The method may also preferably include, in a service base station initiated handover, receiving a handover request from the serving base station prior to transmitting a handover response to the serving base station.

The mobile subscriber station may preferably be released from the serving base station when the handover complete status message indicates successful handover. The mobile subscriber station may preferably resume normal communication with the serving base station when the handover complete status message indicates handover failure.

The step of performing the ranging procedure may preferably include receiving a frame slot allocation from the target base station for a fast ranging, transmitting a ranging request to the target base station using the allotted frame slot, and receiving a ranging response from the target base station.

The handover complete status message from the target base station to the serving base station may preferably be an inter-base station backbone message. The handover indicator may preferably include one of (1) serving base station release, (2) handover cancel, and (3) handover rejection.

In another embodiment, a method of performing handover operation in a wireless communication system includes receiving a handover request from a mobile subscriber station through a first communication link, transmitting a handover pre-notification to a target base station, and transmitting a handover response upon the serving base station receiving a handover confirmation from the target base station. The method also includes receiving a handover indicator from the mobile subscriber station indicating a handover operation to the target base station and performing a setup procedure between the mobile subscriber station and the target base station to establish a second communication link with the target base station while maintaining the first communication link with the serving base station. The method also includes releasing the mobile subscriber station or continuing normal communication with the mobile subscriber station in response to a handover complete status message from the target base station to the serving base station.

In yet another embodiment, a method of performing handover operation in a wireless communication system comprises transmitting a handover pre-notification to a target base station. The method also comprises transmitting a handover response upon the serving base station receiving a handover confirmation from the target base station and transmitting a handover request to a mobile subscriber station that is in communication with the serving base station through a first communication link. The method also comprises receiving a handover response from the mobile subscriber station indicating a handover operation to the target base station. The method also comprises performing a setup procedure between the mobile subscriber station and the target base station to establish a second communication link with the target base station while maintaining the first communication link with the serving base station. The method also comprises releasing the mobile subscriber station or continuing normal communication with the mobile subscriber station in response to a handover complete status message from the target base station to the serving base station.

The handover request may preferably comprise a possible handover target base station. The method may also preferably comprise receiving a handover complete message from the target base station to the serving base station.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
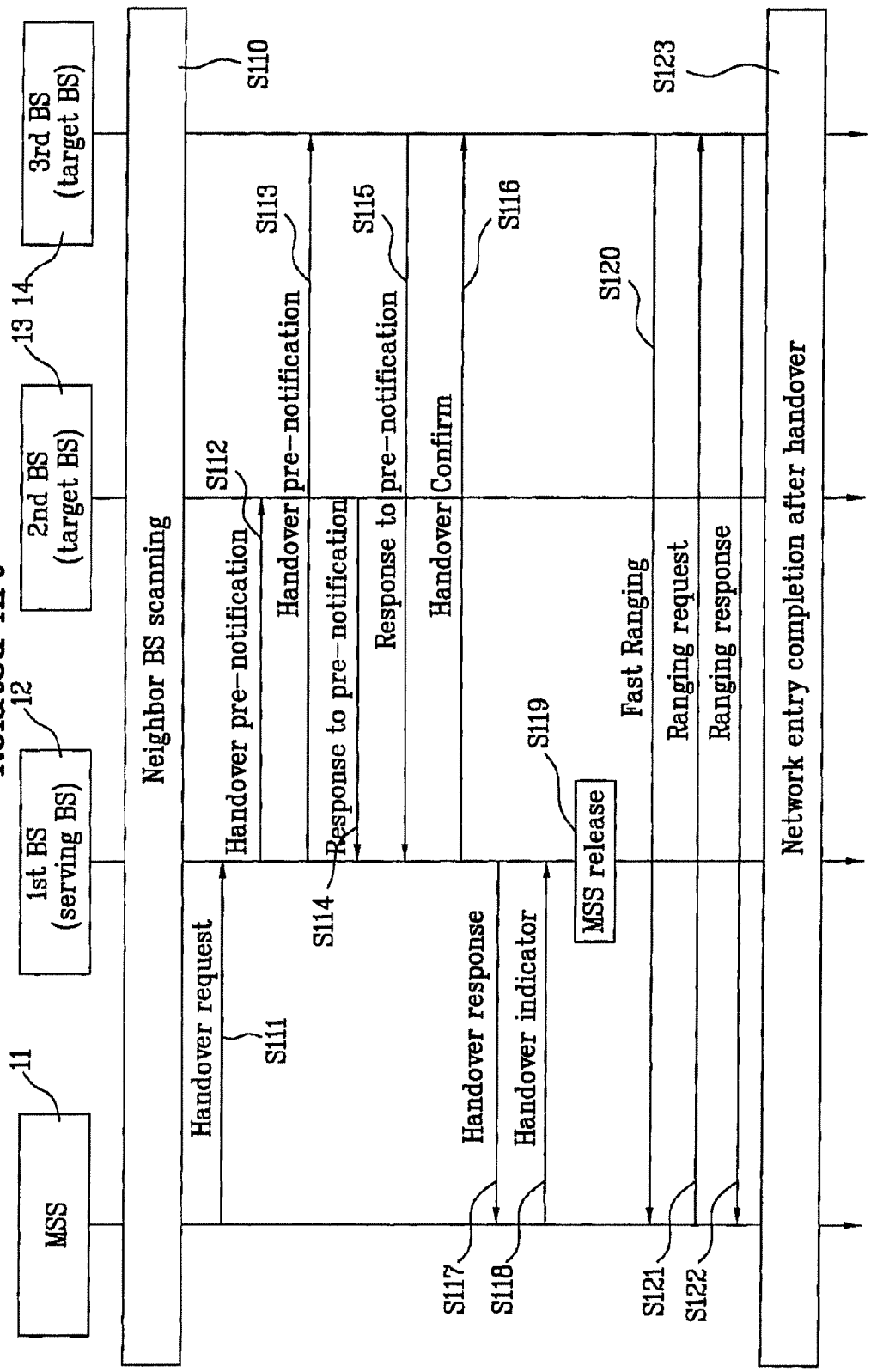
FIG. 1 is a diagram illustrating a handover process requested by a mobile subscriber station (MSS).
Figure 2:
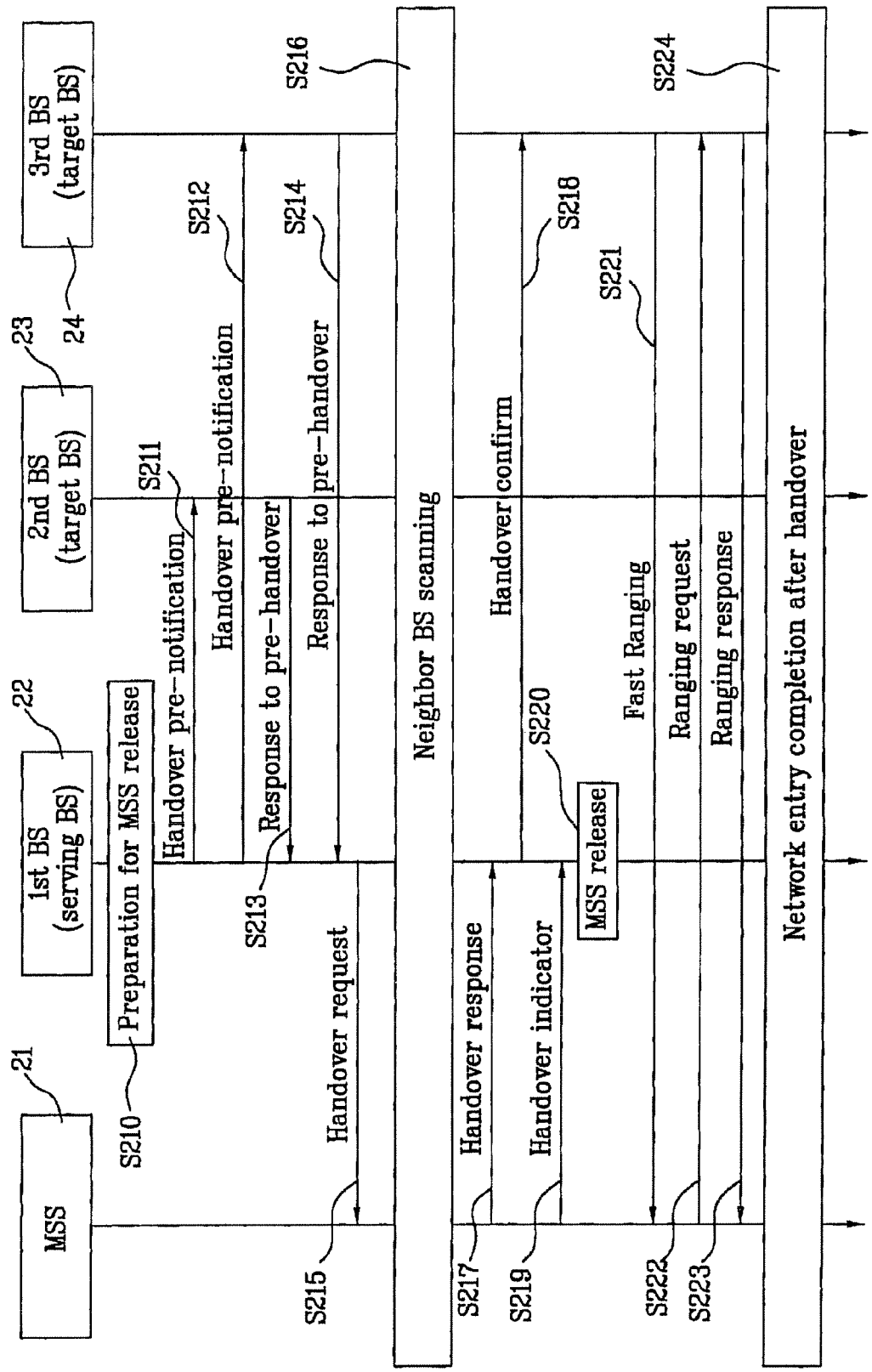
FIG. 2 is a diagram illustrating a handover process requested by a base station (BS).
Figure 3:
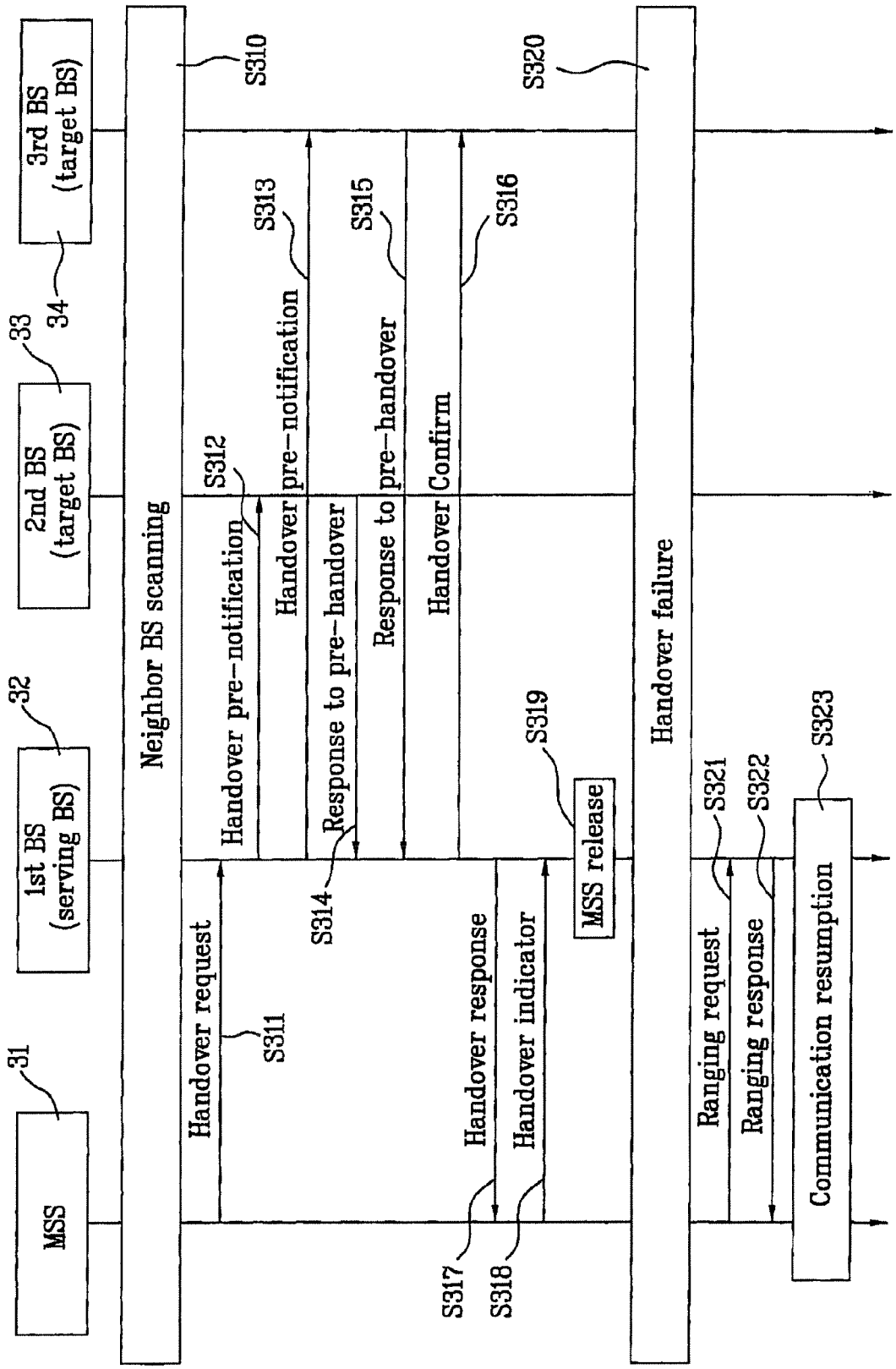
FIG. 3 is a diagram illustrating a process by which an MSS reenters a former serving BS, such as in the case of a call drop.
Figure 4:
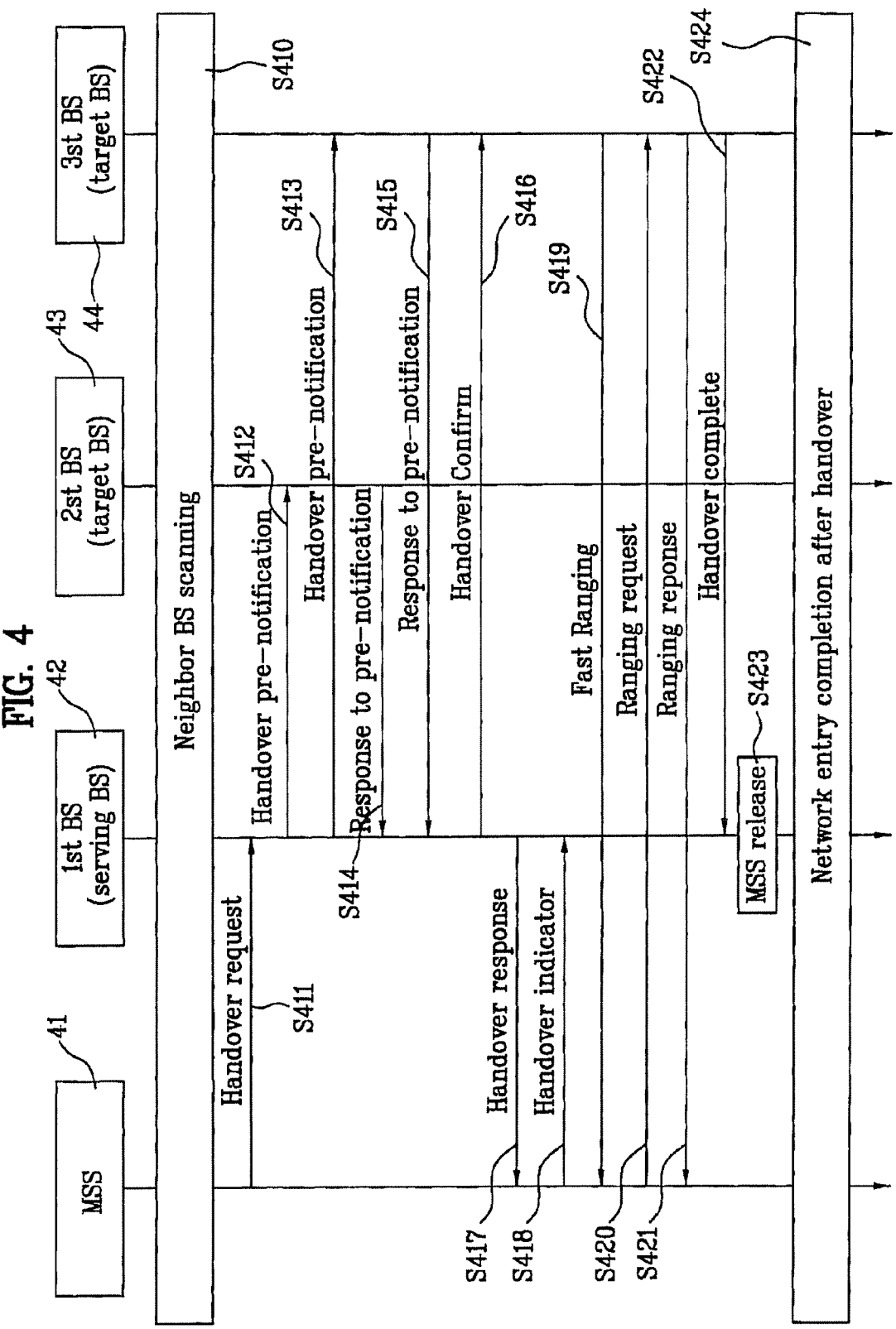
FIG. 4 is a diagram illustrating a handover process initiated by a MSS, according to one embodiment of the present invention.

FIG. 4 is a diagram illustrating a handover process initiated by a mobile subscriber station (MSS), according to one embodiment of the present invention.

Referring to FIG. 4, an MSS 41 performs a scanning procedure to measure qualities of signals transmitted from neighboring base stations (BSs) (S410). If the MSS 41 determines that a handover needs to be performed based on results of the neighboring BS scanning procedure, the MSS 41 may transmit a handover request message (e.g., MOB-MSS-HO-REQ) to a serving BS 42 (S411).

The serving BS 42 receives the handover request message and may transmit a handover pre-notification message (e.g., HO-pre-notification) to a neighboring BS, such as for example, handover target BSs (target BSs) 43 and 44 (S412, S413). The handover pre-notification message may preferably include information that the MSS 41 has requested a handover, as well as an identifier (MSS identifier) of the MSS requesting the handover, connection parameters, capabilities, a required bandwidth, and quality of service information.

Each of the neighboring handover target BSs 43 and 44 may receive the handover pre-notification message and may transmit a handover pre-notification response message (e.g., HO-pre-notification-response) to the serving BS 42 in response to the handover pre-notification message (S414, S415). The handover pre-notification response message may preferably include acknowledgement information pertaining to the handover pre-notification message and capability information pertaining to the requested quality of service.

The serving BS 42 may select one of the neighboring handover target BSs 43 and 44 based on the handover pre-notification response message and may transmit a handover confirm message (e.g., HO-confirm) to the selected target BS 43 or 44 (S416). The serving BS 42 may transmit a handover response message (e.g., MOB-BSHO-RSP), including information pertaining to the possible handover target BS, to the MSS 41 (S417). The MSS 41 receives the handover response message and may transmit a handover indicator message (e.g., MOB-HO-IND) to release a connection from the MSS 41 to the serving BS 42 (S418).

An exemplary configuration of the handover indicator message is shown in Table 1.

TABLE 1

| Syntax | Size | Notes |
| --- | --- | --- |
| MOB_HO_IND_Message Format( ){ | | |
| Management Message Type = 56 | 8 bits | |
| reserved | 6 bits | Reserved; shall be set to zero |
| HO_IND_type | 2 bits | 00: Serving BS release |
| | | 01: HO cancel |
| | | 10: HO rejection |
| | | 11: Resume Communication |
| Target_BS_ID | 48 bits | Applicable only when HO_IND_type is set to 00 or 01 |
| HAMC Tuple | 21 bytes | |
| } | | |

The handover indicator message (MOB_HO_IND) may include information to notify the former serving BS 42 to resume communication with the MSS 41 if the handover of the MSS 41 to the handover target BS fails.

Before the connection to the MSS 41 to the serving BS 42 is released, the MSS may preferably execute a fast ranging (e.g., Fast Ranging_IE), a ranging request (e.g., RNG-REQ), and a ranging response (e.g., RNG-RSP) with the target BS selected for the handover (S419, S420, S421). In the embodiment, the target BS 44 is selected for the handover. The ranging request may preferably require uplink synchronization between the MSS 41 and the target BS 44. The fast ranging may preferably comprise a frame slot allocation by the target base station 44 to enable the MSS 41 to use the allotted frame slot for performance of fast ranging.

In one embodiment, if the handover is successfully performed, the handover target BS 44 may transmit a handover result to the serving BS 42 via a handover complete message (e.g., HO-Complete). The former serving BS 42 may preferably recognize the successful completion of the handover via the handover complete message and may release the serving BS's 42 connection to the MSS 41 (S423). Execution of initial network entry may then be completed (S424).

An exemplary configuration of the handover complete message is shown in Table 2.

TABLE 2

| Field | Size | Notes |
|---|---|---|
| Global Header | 152 bits | |
| MSS unique identifier | 48 bits | 48-bit unique identifier used by MSS on initial network entry |
| Reason | 8 bits | #0: Successful Handover<br>#1: Handover Failure due to xxx<br>#2: Handover failure due to yyy<br>#3~7: reserved |
| Security field | TBD | A means to authenticate this message |

The handover complete message may preferably be an inter-base station backbone message to provide notification of a handover state of the MSS 41 from a new serving BS to the former serving BS 42. Using the handover complete message, the former serving BS 42 may determine whether the MSS 41 has completed the handover to the handover target BS 44. In a case where there is a handover failure, the reason for the handover failure (failure reason) may preferably be set to be delivered to the former serving BS 42. The failure reason may be, for example, a call drop that causes the MSS 41 to fail in accessing the handover target BS 44.

In the event that the handover process is completed, the former serving BS 42 may maintain resources and information associated with the MSS 41 for a predetermined time duration (where there is no instruction from the new serving BS 44).

Figure 5:
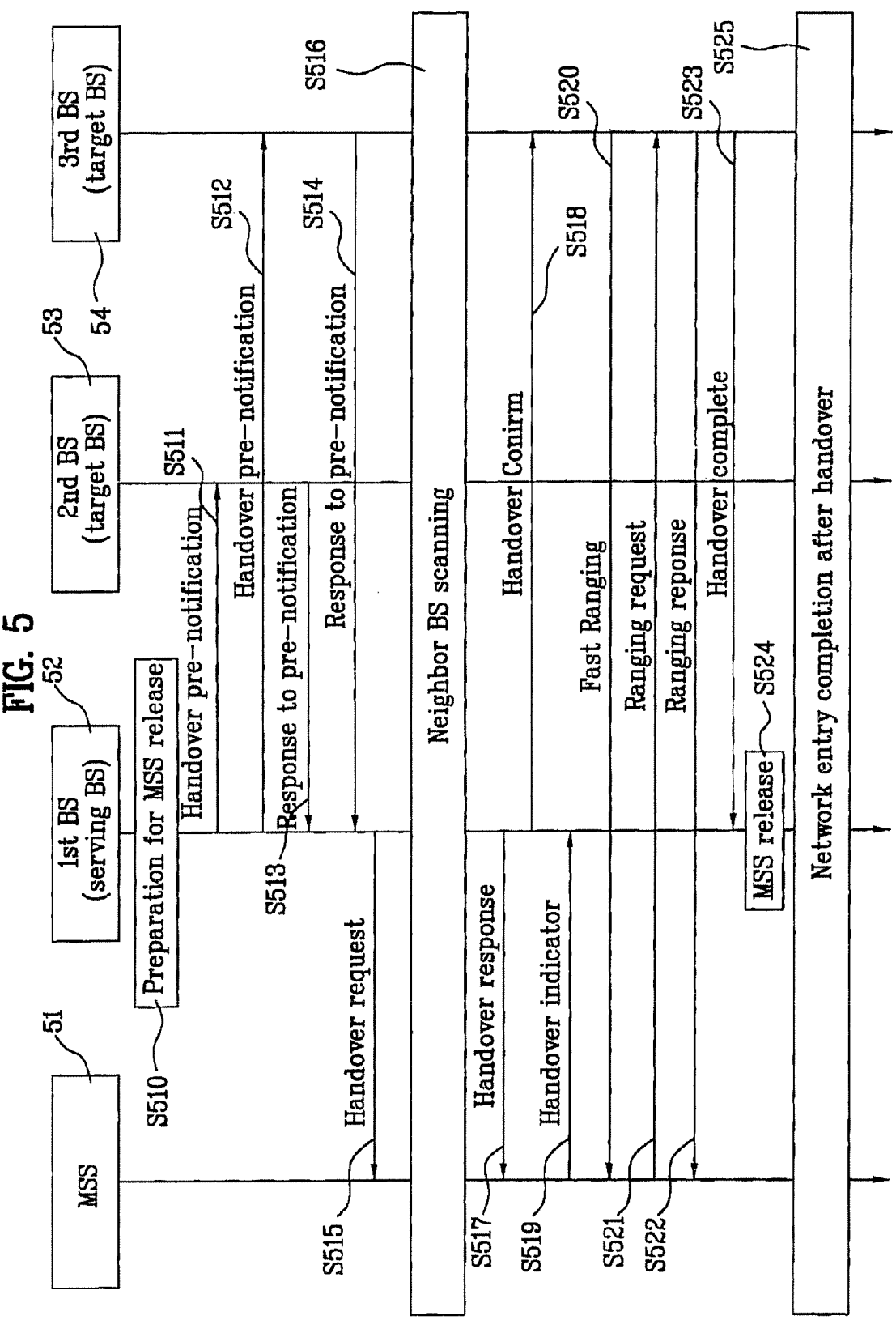
FIG. 5 is a diagram illustrating a handover process initiated by a BS, according to one embodiment of the present invention.

FIG. 5 is a diagram illustrating a handover process initiated by a BS, according to one embodiment of the present invention.

Referring to FIG. 5, a serving BS 52 triggers a procedure (e.g., trigger-to-release-MSS) to release a connection from an MSS 51 according to a corresponding determination (S510).

The serving BS 52 may transmit a handover pre-notification message (e.g., HO-pre-notification) including information required for the handover of the MSS 51 to neighboring handover target BSs 53 and 54 (S511, S512). The handover pre-notification message may include an identifier (MSS identifier) of the MSS requesting the handover, connection parameters, capabilities, a required bandwidth, and quality of service information.

Each of the neighboring handover target BSs 53 and 54 may receive the handover pre-notification message and may transmit a handover pre-notification response message (e.g., HO-pre-notification-response) to the serving BS 52 in response to the handover pre-notification message (S513, S514). The handover pre-notification response message may preferably include acknowledgement information pertaining to the handover pre-notification message and capability information pertaining to the requested quality of service.

The serving BS 52 may preferably transmit a handover response message to the MSS 51 based on the information received via the handover pre-notification response message (S515). The handover response message may preferably include information pertaining to the target BSs 53 and 54 available for the handover. The MSS 51 may preferably perform a neighboring BS scanning procedure to measure quality of received signals on the neighboring target BSs, recognized via the handover response message (S516).

In another embodiment, in a case where the neighboring BS scanning procedure finds the target BS 54 for the handover, the MSS 51 may transmit a handover response message including target BS information for the handover to the serving BS 52 (S517). The serving BS 52 also may transmit a handover confirm message to the target BS 54, with which the MSS 51 determines to perform the handover (S518).

The MSS 51 may transmit a handover indicator message (e.g., MOB-HO-IND) to release a connection from the MSS 51 to the serving BS 52 (S519). The handover indicator message may preferably be configured as shown in Table 1.

Before the connection of the MSS 51 to the serving BS 52 is released, the MSS 51 may preferably execute a fast ranging (e.g., Fast Ranging_IE), a ranging request (e.g., RNG-REQ), and a ranging response (e.g., RNG-RSP) with the serving target BS 54 for the handover (S520, S521, S522).

In yet another embodiment, if the handover is successfully performed, the handover target BS 54 may transmit a handover result to the serving BS 52 via a handover complete message (e.g., HO-Complete). The handover complete message may preferably be configured as shown in Table 2. The former serving BS 52 may preferably recognize successful completion of the handover via the handover complete message and may release its connection to the MSS 51 (S524). Execution of initial network entry may then be completed (S525).

Figure 6:
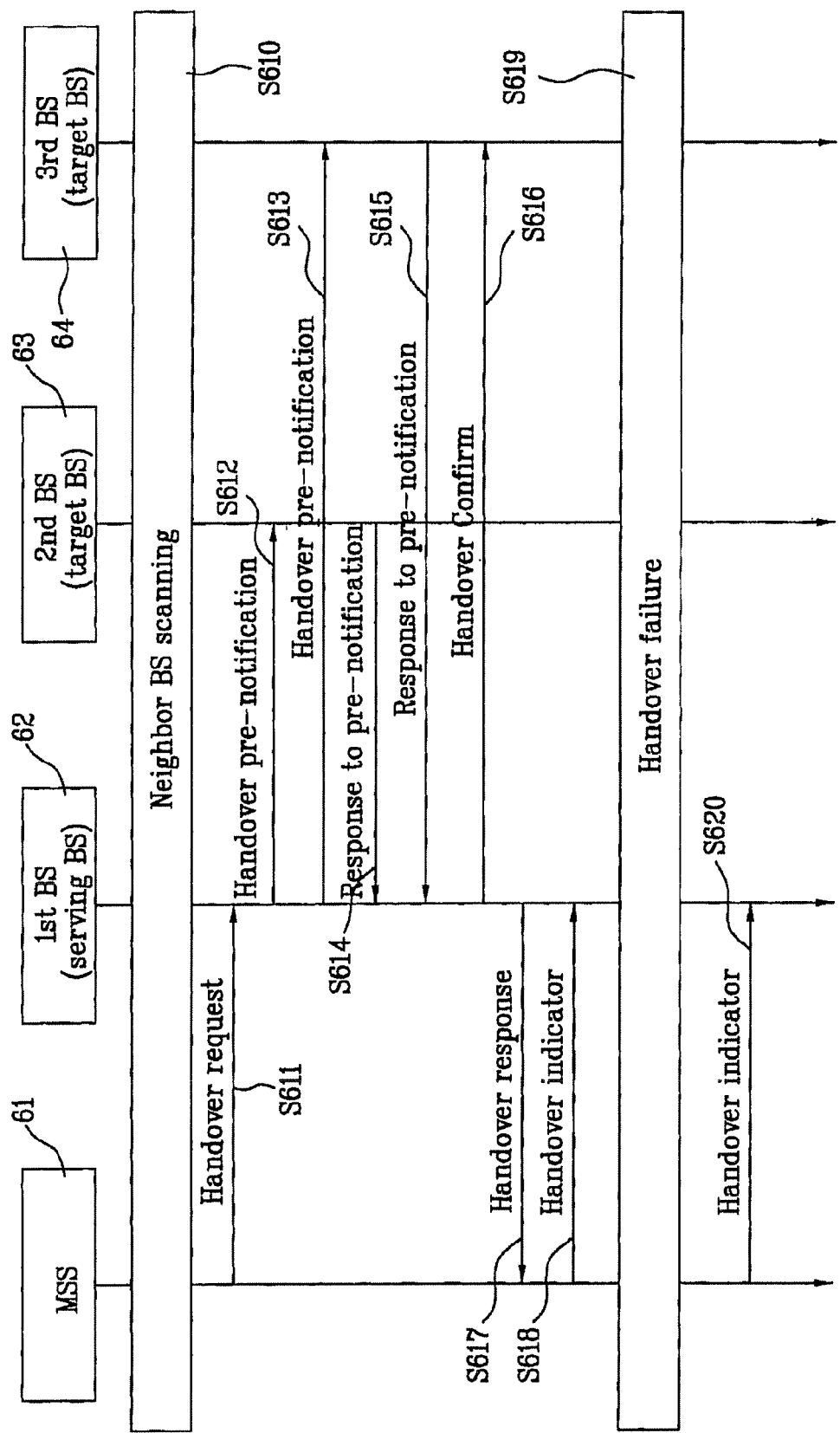
FIG. 6 is a diagram illustrating a process by which an MSS resumes communications with a former serving BS, in case of a handover failure, according to one embodiment the present invention.

FIG. 6 is a diagram illustrating a process by which an MSS resumes communications with a former serving BS, in case of a handover failure, according to one embodiment the present invention. The handover failure may be due to, for example, a call drop or other failure reason.

Referring to FIG. 6, an MSS 61 performs a scanning procedure to measure qualities of signals transmitted from neighboring BSs (S10). If the MSS 61 determines that a handover needs to be performed based on results of the neighboring BS scanning procedure, the MSS 61 may preferably transmit a handover request message (e.g., MOB-MSS-HO-REQ) to a serving BS 62 (S611).

The serving BS 62 receives the handover request message and may transmit a handover pre-notification message (e.g., HO-pre-notification) including information that the MSS 61 has requested a handover to a neighboring BS, such as for example, handover target BSs 63 and 64 (S612, S613). The handover pre-notification message may also include an identifier (MSS identifier) of the MSS requesting the handover, connection parameters, capabilities, a required bandwidth, and quality of service information.

Each of the neighboring handover target BSs 63 and 64 may receive the handover pre-notification message and may transmit a handover pre-notification response message (e.g., HO-pre-notification-response) to the serving BS 62 in response to the handover pre-notification message (S614, S615). The handover pre-notification response message may preferably include acknowledgement information pertaining to the handover pre-notification message and capability information pertaining to the requested quality of service.

The serving BS 62 may preferably select one of the neighboring handover target BSs 63 and 64 based on the handover pre-notification response message and may transmit a handover confirm message (e.g., HO-confirm) to the selected target BS 63 or 64 (S616). The serving BS 62 may also transmit a handover response message (e.g., MOB-BSHO-RSP), including information pertaining to the handover target BS, to the MSS 61 (S617). The MSS 61 receives the handover response message and may transmit a handover indicator message (e.g., MOB-HO-IND) to release a connection from the MSS 61 to the serving BS 62 (S618).

In still another embodiment, when the MSS 61 attempts to connect to the handover target BS 64, a handover failure, such as for example a call drop, occurs (S619). The MSS 61 may preferably recognize the handover failure and may notify the handover target BS 64. The MSS 61 may also cancel the handover from the former serving BS 62 and may transmit a message to resume communications with the former serving BS 62. Because the connection between the serving BS 62 and the MSS 61 was not yet released, the MSS 61 may maintain the connection with the serving BS 62 without executing a procedure for re-entering the serving BS 62. Thus, although the handover attempt failed, the MSS 61 may maintain the connection with the serving BS 62 without executing a procedure for re-entering the serving BS 62. In order to resume communications with the former serving BS 62, the exemplary handover indicator message shown in Table 1 may preferably be used.

In one embodiment, a method of performing handover operation in a wireless communication system includes communicating with a serving base station through a first communication link and receiving from the serving base station, handover information associated with at least one candidate target base station, wherein the handover information comprises at least quality of service capable of being handled by the at least one candidate target base station. The method also includes transmitting a handover indicator to the serving base station indicating a handover operation to a selected target base station, wherein the mobile subscriber station determines whether to perform handover in response to the handover information, and performing a ranging procedure with the selected target base station to establish a second communication link with the selected target base station while maintaining the first communication link with the serving base station, wherein the ranging procedure comprises attempting to establish an uplink synchronization and power adjustment between the mobile subscriber station and the selected target base station. The method also includes being released from the serving base station in response to a handover complete status message from the selected target base station to the serving base station, or resuming normal communication with the serving base station if the handover fails with the selected target base station.

The method may also preferably include receiving a handover response from a serving base station upon the serving base station transmitting a handover confirmation to a handover target base station, wherein the handover response comprises at least quality of service information requested to be handled by the handover target base station. The method may also preferably include, in a mobile subscriber station initiated handover, transmitting a handover request to a serving base station through a first communication link prior to receiving the handover response from the serving base station. The method may also preferably include, in a service base station initiated handover, receiving a handover request from the serving base station prior to transmitting a handover response to the serving base station.

The mobile subscriber station may preferably be released from the serving base station when the handover complete status message indicates successful handover. The mobile subscriber station may preferably resume normal communication with the serving base station when the handover complete status message indicates handover failure.

The step of performing the ranging procedure may preferably include receiving a frame slot allocation from the target base station for a fast ranging, transmitting a ranging request to the target base station using the allotted frame slot, and receiving a ranging response from the target base station.

The handover complete status message from the target base station to the serving base station may preferably be an inter-base station backbone message. The handover indicator may preferably include one of (1) serving base station release, (2) handover cancel, and (3) handover rejection.

In another embodiment, a method of performing handover operation in a wireless communication system includes receiving a handover request from a mobile subscriber station through a first communication link, transmitting a handover pre-notification to a target base station, and transmitting a handover response upon the serving base station receiving a handover confirmation from the target base station. The method also includes receiving a handover indicator from the mobile subscriber station indicating a handover operation to the target base station and performing a setup procedure between the mobile subscriber station and the target base station to establish a second communication link with the target base station while maintaining the first communication link with the serving base station. The method also includes releasing the mobile subscriber station or continuing normal communication with the mobile subscriber station in response to a handover complete status message from the target base station to the serving base station.

In yet another embodiment, a method of performing handover operation in a wireless communication system comprises transmitting a handover pre-notification to a target base station. The method also comprises transmitting a handover response upon the serving base station receiving a handover confirmation from the target base station and transmitting a handover request to a mobile subscriber station that is in communication with the serving base station through a first communication link. The method also comprises receiving a handover response from the mobile subscriber station indicating a handover operation to the target base station. The method also comprises performing a setup procedure between the mobile subscriber station and the target base station to establish a second communication link with the target base station while maintaining the first communication link with the serving base station. The method also comprises releasing the mobile subscriber station or continuing normal communication with the mobile subscriber station in response to a handover complete status message from the target base station to the serving base station.

The handover request may preferably comprise a possible handover target base station. The method may also preferably comprise receiving a handover complete message from the target base station to the serving base station.

Accordingly, the present invention may efficiently execute a handover and/or resume communications in a wireless access system when a mobile subscriber station (MSS) returns to a former serving base station (BS), in a case of a failed handover.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. A method of performing a handover operation in a serving base station, the method comprising:
    receiving a handover request message from a mobile subscriber station if the mobile subscriber station determines that the handover operation needs to be performed;
    transmitting a handover pre-notification message to one or more handover target base stations;
    selecting at least one of the one or more handover target base stations;
    transmitting a handover response message to the mobile subscriber station, wherein the handover response message comprises information pertaining to the one or more handover target base stations;
    maintaining resources and information associated with the mobile subscriber station for a predetermined time duration if a handover indication message is received from the mobile subscriber station, wherein the handover indication message indicates intent to release a connection; and
    recognizing the successful completion of the handover operation and releasing the connection to the mobile subscriber station if a handover complete message is received from the handover target base station.

2. The method of claim 1, wherein the handover target base station executes a fast ranging process with the mobile subscriber station before the handover target base station sends the handover complete message.

3. The method of claim 2, wherein the handover target base station allocates resources which the mobile subscriber station uses for performance of fast ranging.

4. The method of claim 1, wherein the handover complete message is an inter-base station backbone message to provide notification of a handover state of the mobile subscriber station.

5. The method of claim 1, furthering comprising receiving the handover indication message from the mobile subscriber station if the handover of the mobile subscriber station to the handover target base station fails, wherein the handover indication message includes information to notify to resume communication with the mobile subscriber station.

6. The method of claim 5, wherein a reason of the handover failure is a call drop that causes the mobile subscriber station to fail in accessing the handover target base station.

* * * * *